United States Patent
Tsotsis (10) Patent No.: US 8,246,882 B2
(45) Date of Patent: Aug. 21, 2012

(54) METHODS AND PREFORMS FOR FORMING COMPOSITE MEMBERS WITH INTERLAYERS FORMED OF NONWOVEN, CONTINUOUS MATERIALS

(75) Inventor: Thomas Karl Tsotsis, Orange, CA (US)

(73) Assignee: The Boeing Company, Chicago, IL (US)

( * ) Notice: Subject to any disclaimer, the term of this patent is extended or adjusted under 35 U.S.C. 154(b) by 735 days.

(21) Appl. No.: 10/974,426

(22) Filed: Oct. 27, 2004

(65) Prior Publication Data

US 2005/0059309 A1 Mar. 17, 2005

Related U.S. Application Data (63) Continuation-in-part of application No. 10/428,500, filed on May 2, 2003, now abandoned, and a continuation-in-part of application No. 10/852,713, filed on May 24, 2004.

(51) Int. Cl.
*B29C 70/44* (2006.01)
*B29C 67/20* (2006.01)
*B32B 5/26* (2006.01)
*B32B 5/06* (2006.01)

(52) U.S. Cl. ............... 264/258; 264/172.19; 264/173.11; 264/175; 264/257; 264/261; 264/263; 264/271.1; 264/279.1; 264/297.4; 264/324; 156/148; 156/556; 442/382; 442/389; 442/390

(58) Field of Classification Search .................. 264/258, 264/279, 328.4
See application file for complete search history.

(56) References Cited

U.S. PATENT DOCUMENTS

| | | | |
|---|---|---|---|
| 2,158,415 A * | 5/1939 | Formhals | 264/10 |
| 3,924,040 A | 12/1975 | Addie et al. | |
| 4,282,283 A | 8/1981 | George et al. | |
| 4,311,661 A | 1/1982 | Palmer | |
| 4,470,862 A | 9/1984 | More et al. | |
| 4,619,344 A | 10/1986 | Uesugi et al. | |
| 4,622,254 A * | 11/1986 | Nishimura et al. | 428/102 |
| 4,840,838 A * | 6/1989 | Wyss | 442/1 |
| 4,902,215 A | 2/1990 | Seemann, III | |
| 4,908,088 A | 3/1990 | Boyd et al. | |
| 4,942,013 A | 7/1990 | Palmer et al. | |

(Continued)

FOREIGN PATENT DOCUMENTS

EP 0205276 * 12/1986

(Continued)

OTHER PUBLICATIONS

Liba, Copcentra MAX 3 CNC, The new multiaxial layer system, two pages, Jan. 27, 2005; http://www.liba.de/tricot/cop_max_layer.htm.

(Continued)

*Primary Examiner* — Jeffrey Wollschlager
(74) *Attorney, Agent, or Firm* — Alston & Bird LLP (57) ABSTRACT

Materials and methods are provided for producing preform materials for impact-resistant composite materials suitable for liquid molding. Interlayers formed of nonwoven, continuous fibers, such as spunbonded, spunlaced, or mesh fabric, are introduced between non-crimped layers of unidirectional reinforcing fibers to produce a preform for use in liquid-molding processes to produce a composite member. Curing of the preform provides increased impact resistance by increasing the amount of energy required to propagate localized fractures due to impact.

21 Claims, 3 Drawing Sheets

U.S. PATENT DOCUMENTS

| | | | |
|---|---|---|---|
| 4,992,228 A | | 2/1991 | Heck et al. |
| 5,028,478 A | | 7/1991 | Odagiri et al. |
| 5,085,928 A | * | 2/1992 | Krueger ............... 428/474.4 |
| 5,190,802 A | | 3/1993 | Pilato |
| 5,241,842 A | | 9/1993 | Hagel |
| 5,281,388 A | | 1/1994 | Palmer et al. |
| 5,288,547 A | | 2/1994 | Elmes et al. |
| 5,364,686 A | * | 11/1994 | Disselbeck et al. ......... 428/174 |
| 5,392,514 A | * | 2/1995 | Cook et al. ............. 29/889.71 |
| 5,440,965 A | | 8/1995 | Cordova et al. |
| 5,716,686 A | | 2/1998 | Black |
| 5,809,805 A | | 9/1998 | Palmer et al. |
| 5,840,637 A | | 11/1998 | Denton et al. |
| 6,027,783 A | | 2/2000 | Wagener |
| 6,099,906 A | | 8/2000 | Palmer et al. |
| 6,139,942 A | | 10/2000 | Hartness et al. |
| 6,265,333 B1 | | 7/2001 | Dzenis et al. |
| 6,276,174 B1 | | 8/2001 | Wunner et al. |
| 6,503,856 B1 | | 1/2003 | Broadway et al. |
| 6,585,842 B1 | | 7/2003 | Bompard et al. |
| 6,668,596 B1 | | 12/2003 | Wagener |
| 2001/0036788 A1 | * | 11/2001 | Sandoe et al. ............ 442/389 |
| 2002/0117252 A1 | | 8/2002 | Baldwin |
| 2004/0053028 A1 | | 3/2004 | Wagener et al. |
| 2004/0180193 A1 | | 9/2004 | Oda et al. |
| 2004/0219855 A1 | | 11/2004 | Tsotsis |
| 2004/0242836 A1 | | 12/2004 | Hayes et al. |
| 2005/0257887 A1 | | 11/2005 | Tsotsis |

FOREIGN PATENT DOCUMENTS

| | | |
|---|---|---|
| EP | 1 101 855 | 5/2001 |
| EP | 1 125 728 | 8/2001 |
| EP | 1 145 841 | 10/2001 |
| EP | 1 175 998 | 1/2002 |
| FR | 2 761 380 | 2/1998 |
| GB | 2 355 469 | 4/2001 |
| JP | 59-26563 | 2/1984 |
| JP | 62-240514 | 10/1987 |
| JP | 64-18151 | 1/1989 |
| JP | 3-234522 | 10/1991 |
| JP | 8-73629 | 3/1996 |
| JP | 8-134757 | 5/1996 |
| JP | 9-279449 | 10/1997 |
| WO | WO 98/44183 | 10/1998 |
| WO | WO 99/44810 | 9/1999 |
| WO | WO 03/038175 | 5/2003 |

OTHER PUBLICATIONS

Search Report and Written Opinion for PCT/US2005/037482 dated Dec. 27, 2006.

* cited by examiner

METHODS AND PREFORMS FOR FORMING COMPOSITE MEMBERS WITH INTERLAYERS FORMED OF NONWOVEN, CONTINUOUS MATERIALS

CROSS-REFERENCES TO RELATED APPLICATIONS

This application is a continuation-in-part of U.S. patent application Ser. No. 10/428,500, filed on May 2, 2003, now abandoned and copending U.S. patent application Ser. No. 10/852,713, filed on May 24, 2004, each of which is hereby incorporated herein in its entirety by reference.

BACKGROUND OF THE INVENTION

1. Field of the Invention

The present invention relates to cured composites built from layers of unidirectional fibers. In particular, the invention utilizes highly porous lightweight materials in conjunction with multilayer preforms to obtain cured articles with improved toughness.

2. Description of Related Art

High-performance composite materials built of alternating layers of unidirectional reinforcing fibers have an advantageous combination of high strength and light weight. As such they find use in aerospace and other industries where such properties are critical. Generally, the composite materials are prepared by laying up a number of alternating layers wherein adjacent layers have unidirectional fibers running at different angles. The net effect of buildup of several layers of such unidirectional fabrics is to provide a composite material having exceptional strength, either quasi-isotropically, or in one or more particular directions.

Such composite materials may be produced as prepregs or as preforms. In prepregs, layers of unidirectional fabrics immersed or impregnated with a matrix material such as a resin are laid-up into the shape of the part to be produced from the composite material. Thereafter, the laid-up part is heated to cure the matrix material and provide the finished composite part. In the preform approach, layers of unidirectional reinforcing fibers or woven, braided, or warp-knit fabric are laid up similarly to the way they are laid-up in the prepreg method. However, in the preform method, the layers are laid-up dry, i.e., without the matrix material. Thereafter, the laid-up material is infused with the matrix material in a liquid-molding process, and the molded part is heated to cure the matrix material as in the prepreg method.

The alternating layers, or lamina, of reinforcing fibers provide the composite articles made from the prepreg or preform process with a great deal of strength, especially in directions that align with specific fiber directions. Accordingly, very strong lightweight parts may be produced, for example, as wings and fuselages of aircraft. Although the alternating lamina of reinforcing fibers provide strength, toughness or impact resistance is determined mainly by the properties of the cured matrix material. Impact-resistant or toughened matrix materials are generally preferred because they are resistant to damage from impact. This is important, for example, in the case of airplane wings made from such composite materials to avoid failure from foreign-object impact during flight, damage resulting from ground-maintenance impact (e.g. from tool drop, forklifts, or other vehicles), and the like. Furthermore, because impact damage in composite materials is generally not visible to the naked eye, it is important for such primary load-bearing structures to be able to carry their full design load after impact and prior to detection using non-destructive techniques.

In prepregs, the matrix material, which is typically an epoxy-based resin formulation, may be toughened by adding particles of a thermoplastic material to the conventional resin. These thermoplastic particles may either be soluble in the matrix resin and dissolve in the epoxy resin or may be insoluble and placed, during the prepregging operation (see, for example, U.S. Pat. No. 5,028,478) on the surface of each layer. Upon cure, the thermoplastic resin in the cured epoxy matrix serves to limit crack propagation through the part. Preform materials may also be stitched before resin infusion and cure to provide toughness and crack resistance. However, one drawback to stitching is the reduction of in-plane mechanical properties, particularly as the stitch density increases. The prepreg approach of applying particles of thermoplastic material in the resin before cure is not directly transferable to the liquid molding processes used to prepare preform articles. In the resin infusion of the liquid molding process, soluble thermoplastics tend to increase the melt-flow viscosity of the matrix resin unacceptably, while insoluble thermoplastic toughening particles tend to be filtered by the preform and thus will not be located uniformly between the plies in the preform.

In the European Patent EP 1 175 998 to Mitsubishi, laminated products formed of reinforcing fibers are provided in which thermoplastic resin layers are provided between layers of the reinforcement fiber. The thermoplastic resin layer is described in the form of a porous film, fiber, network structure, knitted loop, and the like. The laminated product uses a thermoplastic layer of sufficient permeability between the layers of reinforcing fibers so as not to inhibit liquid resin flow during a liquid molding process. One drawback inherent in processes such as those described in EP 1 175 998 is that the preform made of alternating layers of reinforcing fibers and thermoplastic resin layers are less than perfectly stable during resin infusion. As a result, the reinforcing fibers and the thermoplastic resin layer tend to move or shift during the liquid molding process. Such moving or shifting can be mitigated by stitching together the layers before infusion with the resin. Another drawback to the processes described in EP 1 175 998 is that they are primarily effective for hand lay-up operations and not for automated lay-up operations that would be more relevant in the fabrication of large aircraft parts or in the continuous production of broad goods.

It would be desirable to provide a molded article made by a preform process in which the reinforcing fibers are held tightly in relative orientation to one another. It would further be desirable to provide a process for making such a preform article in widths and lengths feasible for producing large-scale parts, such as airplane wings, from them.

SUMMARY OF THE INVENTION

In one embodiment, the invention provides a preform and a composite member made up of reinforcing layers of unidirectional fibers. Non-woven interlayers made of spunbonded, spunlaced, or mesh fabric of fibers are disposed between and stitched to the reinforcing layers. The preform can be used in a liquid-molding process by which a matrix material is infused into the preform, followed by heating to gel and set the matrix material. The interlayers are permeable to permit the flow of matrix material during the liquid-molding operation. The layers are secured together with stitches or knit threads, such that the unidirectional fibers are held in place during the infusion process and subsequent curing of the matrix material to produce a fiber reinforced composite material, which can be formed in a desired contoured shape of a composite member. The material making up the interlayers can increase the toughness or impact resistance of the finished composite member as compared to a corresponding member that is formed without the interlayers or with other materials provided between the layers of reinforcing fibers. For example, the material of the interlayers can increase the Mode I or Mode II impact resistance, and the material can be chosen for compatibility with the matrix material upon curing. In one embodiment, the matrix material is an epoxy resin and the interlayer fibers are made of a polyamide, polyimide, polyamide-imide, polyester, polybutadiene, polyurethane, polypropylene, polyetherimide, polysulfone, polyethersulfone, polyphenylsulfone, polyphenylene sulfide, polyetherketone, polyethertherketone, polyarylamide, polyketone, polyphthalamide, polyphenylenether, polybutylene terephthalate, polyethylene terephthalate, polyester-polyarylate (e.g. Vectran®), polyaramid (e.g. Kevlar®), polybenzoxazole (e.g. Zylon®), viscose (e.g. Rayon®), carbon-fiber, and glass-fiber.

In another embodiment, the invention provides a method for forming a composite material. The method includes alternately disposing reinforcing layers formed of fibers of a reinforcing material and interlayers, which are formed of a nonwoven fabric of continuous fibers. For example, the nonwoven fabric can be formed by spunbonding, spunlacing, or fabric meshing. The material of the interlayers is adapted to increase the impact resistance of the composite material. In some cases, the interlayers can be formed of a substantially tackless material so that the reinforcing layers and the interlayers are substantially unbonded prior to stitching. The reinforcing layers and the interlayers are stitched, and the reinforcing layers are infused with a matrix material that flows through the interlayers. A composite member can be formed from the preform by curing the matrix material, with the preform supported in a configuration corresponding to the desired contour of the finished member.

Fiber-reinforced composite materials may be made by molding a preform and infusing the preform with a thermosetting resin in a number of liquid-molding processes. Liquid-molding processes that may be used in the invention include, without limitation, vacuum-assisted resin transfer molding (VARTM), in which resin is infused into the preform using a vacuum-generated pressure differential. Another method is resin transfer molding (RTM), wherein resin is infused under pressure into the preform in a closed mold. A third method is resin film infusion (RFI), wherein a semi-solid resin is placed underneath or on top of the preform, appropriate tooling is located on the part, the part is bagged and then placed in an autoclave to melt and infuse the resin into the preform. The RFI method is described in U.S. Pat. No. 4,311,661, titled "Resin Impregnation Process," which issued Jan. 19, 1982, the entire contents of which is incorporated herein by reference.

BRIEF DESCRIPTION OF THE DRAWINGS

The present invention will become more fully understood from the detailed description and the accompanying drawings, wherein.

DETAILED DESCRIPTION OF THE INVENTION

The present invention now will be described more fully with reference to the accompanying drawings, in which some, but not all embodiments of the invention are shown. This invention may be embodied in many different forms and should not be construed as limited to the embodiments set forth; rather, these embodiments are provided so that this disclosure will be thorough and complete, and will fully convey the scope of the invention to those skilled in the art. Like numbers refer to like elements throughout.

Figure 2:
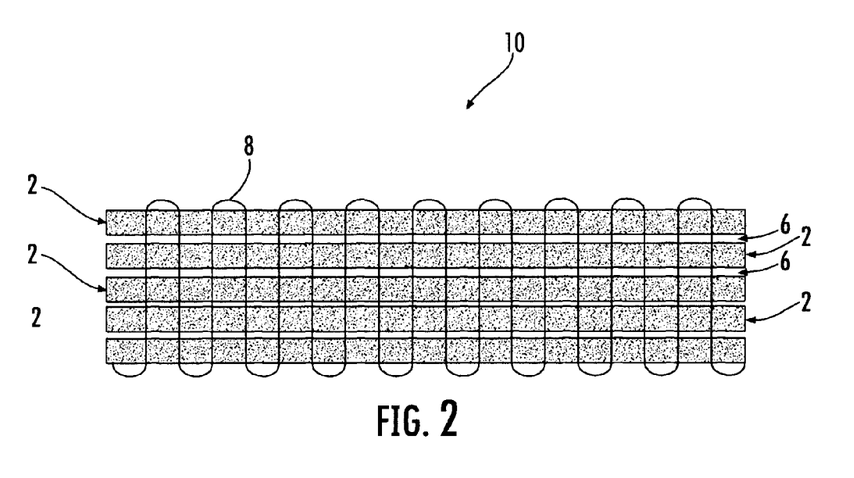
FIG. 2 is a section view illustrating a stitched multiaxial fabric of a preform according to one embodiment of the present invention.

FIG. 2 illustrates a multiaxial fabric 10 that is made of alternating layers 2 of reinforcing fibers and interlayers 6 according to one embodiment of the present invention. Each interlayer 6 is typically a nonwoven configuration, such as a spunbonded, spunlaced, or mesh fabric of thermoplastic fibers. The interlayers 6 are disposed between and knit-stitched to the reinforcing layers 2. The interlayers 6 need not be otherwise bonded or connected to the layers 2 of the reinforcing fibers. Fabrics in which the interlayers 6 and reinforcing layers 2 are melt-bonded together are further described in U.S. application Ser. No. 10/428,500, titled "Highly Porous Interlayers to Toughen Liquid-Molded Fabric Based Composites," filed May 2, 2003. In either case, the resulting multiaxial fabric 10 may be manufactured by a number of processes to produce preforms that are 12-300" wide, and typically at least about 50" wide. For example, if the interlayers 6 are formed with a nonwoven configuration, e.g., a fabric that is spunbonded, spunlaced, or mesh fabric, each interlayer 6 can be formed by an automated method and with relatively wide widths that can be difficult or impossible to form by braiding, weaving, and the like. The fabric 10 can be used as a preform 20 (FIG. 3) that is used to form a composite member 22 (FIG. 4) having a desired configuration, e.g., by disposing the preform 20 in a mold 24, infusing the preform 20 with a matrix material such as a thermosetting resin in a liquid-molding process, and then heating the preform 20 in the mold to gel and set the matrix material. The interlayers 6 can be lightweight and porous to thereby minimize distortion of the layers 2 of the reinforcing fibers and reduce the resistance of a flow of the matrix material through the interlayers 6 during infusion of the layers 2 of the reinforcing material.

Each layer 2 of the reinforcing fibers is typically a layer of unidirectional fibers. Such layers 2 of unidirectional fibers for use in multiaxial preforms and fiber reinforced composite materials are well known in the art. For example, the unidirectional fibers can be made of carbon fibers. Other examples of unidirectional fibers include, without limitation, glass fibers and mineral fibers. The layers 2 of unidirectional fibers can be prepared by a laminating process in which unidirectional carbon fibers are taken from a creel containing multiple spools of fiber that are spread to the desired width and layered with a interlayer 6.

Figure 4:
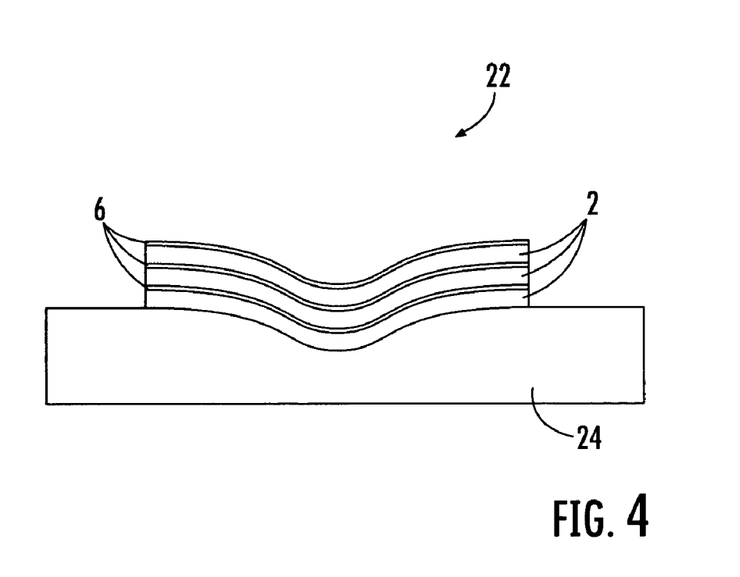
FIG. 4 is an elevation view illustrating a composite member formed with the preform of FIG. 3 using a contoured mold.

Each interlayer 6 is typically made of a spunbonded, spunlaced, or mesh fabric of fibers, which can be thermoplastic. The fibers may be selected from among any type of fiber that is compatible with the thermosetting matrix material used to form the fiber reinforced composite material of the member 22. For example, the fibers of the interlayer 6 may be selected from the group consisting of polyamide, polyimide, polyamide-imide, polyester, polybutadiene, polyurethane, polypropylene, polyetherimide, polysulfone, polyethersulfone, polyphenylsulfone, polyphenylene sulfide, polyetherketone, polyetherketherketone, polyarylamide, polyketone, polyphthalamide, polyphenylenether, polybutylene terephthalate, polyethylene terephthalate, polyester-polyarylate (e.g. Vectran®), polyaramid (e.g. Kevlar®), polybenzoxazole (e.g. Zylon®), viscose (e.g. Rayon®), carbon-fiber, and glass-fiber.

Generally, the interlayers 6 are formed of any of various thermoplastic materials that are chemically compatible with the matrix resin and that do not dissolve during infusion and cure into the matrix. The material of the interlayers 6 is not soluble to any great extent in the underlying matrix, except as to facilitate better contact and/or adhesion between the interlayer and the matrix. The melting point of the thermoplastic material of the interlayers 6 is typically near or above the cure temperature of the matrix resin to ensure that composite properties, such as elevated-temperature compression strength, are not compromised. The thermoplastic materials also have good resistance to solvents like ketones, water, jet fuel, and brake fluids to ensure that the composite material does not become susceptible to strength degradation is exposed to these solvents. Although the present invention is not limited to any particular theory of operation, it is believed that, in order for the interlayers 6 to provide a desired increase in the impact resistance of the resulting composite member 22, the thermoplastic material must have some chemical compatibility with the resin (e.g. chemical bonding, hydrogen bonding, etc.); the thermoplastic material must have sufficient inherent toughness (i.e., not too brittle); and the thermoplastic material must have a fairly high modulus (i.e., not so low that the thermoplastic material acts like a plasticizing layer and reduces properties).

Figure 1A:
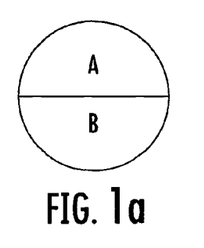
FIGS. 1a-1d are section views schematically illustrating fibers for the interlayers of preforms and composite members formed according to various embodiments of the present invention.
Figure 1B:
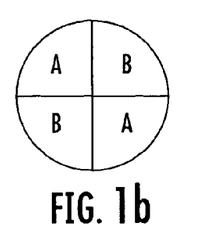
Figure 1C:
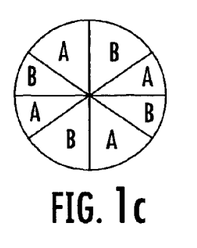
Figure 1D:
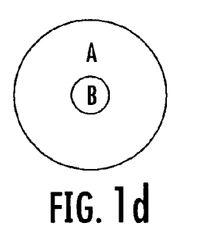

In one embodiment, the fibers of the interlayers 6 are made from two or more materials. For example, the two or more materials may be prepared by mechanically mixing different fibers, which are used to create the spunbonded, spunlaced, or mesh fabric. Alternatively, the two or more materials may be used to form a bi-component fiber, tri-component fiber, or higher component fiber for use as the interlayer 6. That is, each fiber of the fabric used for the interlayer 6 can include multiple materials. Non-limiting examples of multi-component fibers are illustrated schematically in FIG. 1. FIG. 1(a) shows in cross-section a fiber made for example by coextrusion of a fiber material A and a fiber material B. Such a fiber may be produced by a spinneret with two outlets. FIG. 1(b) shows a bi-component fiber made from materials A and B such as would be produced by extrusion through four spinnerets. Similarly, FIG. 1(c) shows a bi-component fiber spun from eight spinnerets. In another embodiment, the bi-component fiber is provided in the form of a core sheath fiber such as illustrated in FIG. 1(d). In a core-sheath fiber, a fiber material of one type, illustrated as B in FIG. 1(d), is extruded as the core, while a fiber material of another type, illustrated as A in FIG. 1(d) is extruded as the sheath. For example, the fiber material A of the sheath can be a polyurethane, and the fiber material B of the core can be a polyamide.

Bi-component fibers such as those illustrated in FIG. 1 and other fibers containing more than two components are well known in the art and can be made by a number of conventional procedures. Additionally, although the fibers in FIG. 1 are illustrated schematically with circular cross-sections, it is to be appreciated that other cross-sections may be used.

Each fiber of the interlayers 6 can have any size, e.g., according to the particular application for the interlayer 6 and the resulting composite member 22. In particular, the fibers making up the interlayer 6 can have diameters from 1 to 100 microns, e.g., from 10 to 75 microns, such as from 10 to 30 microns. In another embodiment, the fibers have diameters from 1 to 15 microns.

The material used for the interlayers 6 can also have a wide range of areal densities. The areal density may be chosen according to the amount required to impart the desired impact resistance, as verified for example by compression-after-impact testing according to Boeing test method BSS 7260 (also known as SACMA SRM 2-88.) The desired impact-resistance level is determined on a part-by-part basis assuming specific impact-energy levels. In one embodiment, the interlayer material has an areal density of 1-50 grams/square meter. In another embodiment, the areal density of each interlayer 6 is about 2-15 grams/square meter, such as between about 5 and 15 grams/square meter. The optimum areal weight for any particular composite member 22 can be determined by trial and error, but typically is between about 2% and 4% of the overall composite weight.

The interlayer material may be a spunbonded fabric. Spunbonded fabrics are produced from continuous fibers that are continuously spun and bonded thermally. These fabrics are commercially available from a wide variety of sources, primarily for the clothing industry. The spunbonded fabrics for use in the present invention typically have areal weights that are generally lower than those of fabrics used in clothing.

In another embodiment, each interlayer 6 is a spunlaced fabric. Spunlaced fabrics are prepared from continuous fibers that are continuously spun and bonded mechanically. These fabrics are commercially available from a wide variety of sources, primarily for the clothing industry. Spunlaced fabrics for use in the present invention typically have areal weights that are generally lower than those commonly used in the clothing industry.

In yet another embodiment, each interlayer 6 comprises a nonwoven mesh fabric. For example, the mesh construction of the interlayer 6 can contain between about 0.5 and 15 threads or fibers per inch in the warp and weft directions.

Figure 3:
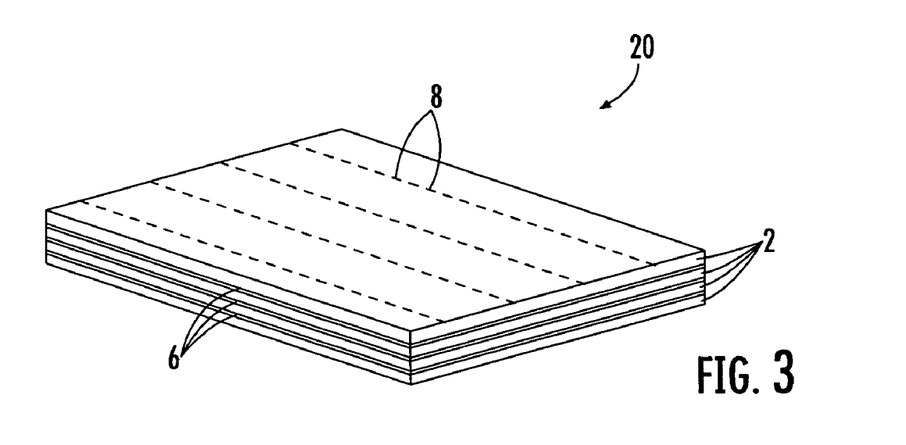
FIG. 3 is a perspective view illustrating a stitched preform for forming a composite member according to yet another embodiment of the present invention.

As shown in FIGS. 2 and 3, the multiaxial preform 20 comprises a plurality of the reinforcing layers 2 with the interlayers 6 disposed between the reinforcing layers 2 and stitched to attach and stabilize the reinforcing layers 2 and interlayers 6 into a multiaxial fabric. Typically, each multiaxial preform 20 has 4 or more reinforcing layers 2, but the preform 20 can have fewer layers 2. For example, the preform 20 can have between 2 and 16 layers (or lamina) of the reinforcing layers 2.

The lamina of unidirectional fibers in the multiaxial fabric 10 may be laid-down in quasi-isotropic or orthotropic patterns. The pattern may be repeated as needed to achieve a desired thickness of the finished composite member 22. The repeated pattern may be constant, or may be varied across the preform 20. Where the repeated pattern is varied across the preform 20, the locally different thicknesses may be mechanically held in place, such as by stitching the lamina of the layers 2 and interlayers 6 together.

Figure 5:
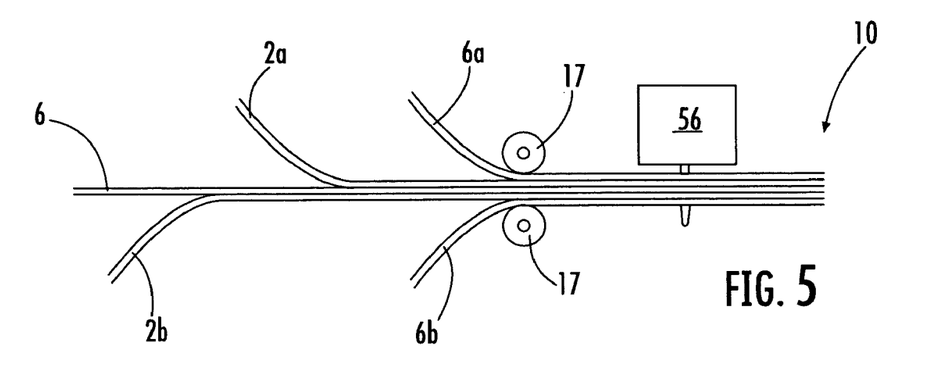
FIG. 5 is an elevation view schematically illustrating a process for preparing a multiaxial fabric with multiple layers and interlayers according to another embodiment of the present invention.
Figure 6:
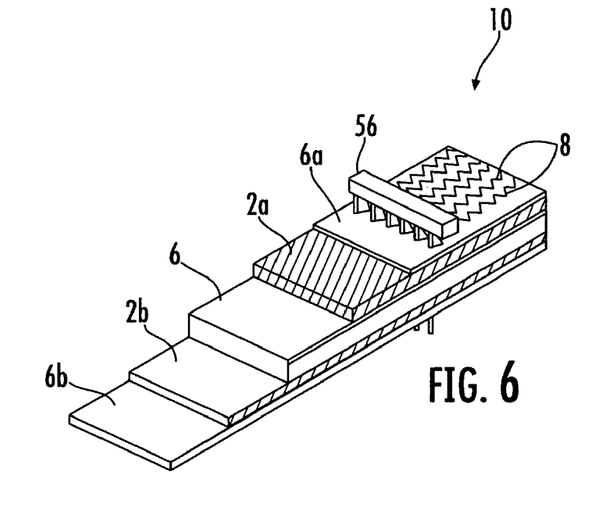
FIG. 6 is a perspective view schematically illustrating the fabric formed according to the process of FIG. 5.

For example, in some cases, the lamina of the reinforcing layers 2 are laid-down in a quasi-isotropic pattern. A quasi-isotropic pattern is one that approximates an isotropic material in the plane of the fibers. This is also known as transverse isotropy. For example, FIGS. 5 and 6 illustrate a +45/−45 pattern, i.e., in which a first layer 2a is disposed at +45° and a second layer 2b is disposed at a −45° relative to the transverse direction of the fabric 10. It is also possible to dispose lamina in a quasi-isotropic 0/+45/90/−45 pattern. Other quasi-isotropic patterns include +45/0/−45/−90; −45/0/+45/90; and 0/+60/−60.

Alternatively, the lamina of the reinforcing layers 2 may be laid-down in an orthotropic pattern. Orthotropic means having fibers or units such that the net result is not quasi-isotropic in plane like the quasi-isotropic patterns just described. An example of an orthotropic pattern is one with 44% 0°, 22% +45°, 22% −45° and 12% 90° fibers. In this example, greater longitudinal strength (along the 0°-direction) and lower shear strength (±45°-direction) and transverse strength (90°-direction) than a quasi-isotropic (25/50/25) lay-up are achieved. The resulting built-up lamina provide higher strength and thickness in the 0°-direction as compared to a quasi-isotropic laminate, but provide lower shear strength and thickness (provided by the ±45° layers 2). Correspondingly, in this example, the 90° strength is lower than a quasi-tropic laminate. The term orthotropic is well understood in the field. For example, a 0° fabric is orthotropic, as well as any other pattern that does not result in balanced average in plane (i.e. quasi-isotropic) properties.

As noted above, it is common to construct a fabric such that it comprises a set of four laminae. The multilayer fabric layer is commonly referred to as a stack. Where desired, a preform construction will comprise a pattern of the four laminae to achieve a desired thickness. For example, when it is desired to build-up a desired thickness, mirror-image lamina stacks are used to prevent post-cure bending and twisting due to thermal stresses created after curing the resin at elevated temperature. In such a case, the total lay-up would be made up of groups of balanced laminae, or laid-up alternately to balance the laminate. This practice is common in the field and is done to ensure the fabrication of flat parts and to avoid the problem of parts with unknown and/or temperature-sensitive configurations.

As previously noted, the interlayers 6 can be stitched (i.e., knitted or sewed) with the thread 8 to the unidirectional fiber layers 2 to maintain the orientation of the layers 2 in place during resin infusion into the mold 24 during a (subsequent) liquid-molding process. For example, each stitch of the thread (referred to collectively by reference numeral 8) can connect one or more of the interlayers 6 to one or more of the layers 2. Thus, a warp-knit, multiaxial fabric 10 may be assembled by knit-stitching the reinforcing layers 2 together with interlayers 6 between the reinforcing layers 2. The knit or sewing thread 8 may be selected from a variety of materials, including without limitation, polyester-polyarylate (e.g. Vectran®), polyaramid (e.g. Kevlar®), polybenzoxazole (e.g. Zylon®), viscose (e.g. Rayon®), acrylic, polyamide, carbon, and fiberglass. Where desired, the knitting or sewing step is carried out after the initial lay-up of the multiaxial preform 20. The same kinds of threads 8 may be used to hold locally different thicknesses mechanically in place by stitching and by tufting.

FIG. 2 shows the fabric 10 of the multiaxial preform 20 for use in a liquid-molding process to form the composite member 22. In FIG. 2, interlayers 6 made of thermoplastic fibers are disposed between reinforcing fabric layers 2 of unidirectional fabrics. Multiple sewing threads 8 are used to hold the lamina 2, 6 of the preform 20 together. As shown in FIG. 2, each thread 8 (and each stitch) extends through each of the layers 2 and interlayers 6 of the preform 20 in alternate directions.

Thus, all of the layers 2 and interlayers 6 can be connected by stitching, with none of the layers 2 and interlayers 6 being melt-bonded or otherwise bonded together. In this regard, the material of the interlayer 6, in some cases, can provide little or no tackiness or stickiness for bonding or adhering to the layers 2. Instead, the stitches 8 can provide any necessary connection between the layers 2 and interlayers 6 and/or mechanical fasteners can be provided for temporary or permanent connection of the layers 2 and interlayers 6. Thus, the fabric 10, the preforms 20, and/or the composite members 22 can be formed according to the present invention without the use of "tackifiers," i.e., materials for bonding the layers 2 and interlayers 6. That is, the stitches 8 can connect the layers 2 and interlayers 6 during the final stacking process and during the infusion process. The lack of a tackifier between the layers 2 and interlayers 6 can increase the penetrability of the preform 20 by the matrix material and thereby facilitate infusion by the matrix material.

Further, the interlayers 6 can be formed of materials that improve specific characteristics of the resulting members 22, such as the impact resistance or toughness, regardless of the tackiness of the interlayer material. Thus, the impact resistance of the resulting composite member 22 can be greater in some cases than the impact resistance that can be achieved in a member of similar dimensions that is formed with interlayers 6 of other materials, such as those materials that provide tackiness, or the impact resistance that can be achieved in a member of similar dimensions that is formed with the composite layers disposed adjacently with no interlayers therebetween. The impact resistance of the composite fabric 10 or member 22 can generally be increased by increasing the amount of energy required to propagate localized fractures due to impact.

A device such as described in U.S. Pat. No. 5,241,842 to Hagel, or U.S. Pat. No. 6,276,174 to Wunner, et al. (the disclosures of which are incorporated by reference) may be used to prepare multiaxial preforms by providing tows of unidirectional carbon fibers. One or a plurality of tows is pulled across pins to create reinforcing layers of unidirectional fibers. In this embodiment, a means is provided for introducing the interlayer material between the layers 2 of unidirectional carbon fibers. Because the interlayer material is non-directional, it need not be introduced at an angle in the way that the unidirectional carbon fibers are.

FIG. 5 illustrates the process of forming the multiaxial fabric 10 according to one embodiment of the present invention. As illustrated, two layers, referred to individually by reference numerals 2a, 2b are stacked with one interlayer 6 therebetween, though in other embodiments more layers 2 and interlayers 6 can be provided. In some cases, interlayers of the thermoplastic material, referred to individually by reference numerals 6a, 6b, can also be provided on the top and/or bottom of the fabric 10 as shown. Any number of the interlayers can be provided. For example, referring to the interlays 6, 6a, 6b illustrated in FIGS. 5 and 6, the fabric 10 can include only the interlayer 6 between the layers 2a, or the interlayer 6 in combination with one or both of the interlayers 6a, 6b. Further, each of the interlayers 6 can have different thicknesses. For example, the interlayers 6a, 6b on the top and bottom of the fabric 10 can be thinner, such as about half as thick, as the interlayer 6 disposed between the layers 2a, 2b. In the illustrated embodiment, the first layer 2a is a +45 layer of carbon and the second layer 2b is a −45 layer of carbon. A perspective view of the fabric 10 is shown in FIG. 6. The layers 2a, 2b and interlayers 6, 6a, 6b can pass through a nip between rollers 17, and the fabric 10 is then processed by a knitting unit 56 that forms stitches 8 in the fabric 10, as shown in FIG. 6.

The multiaxial preforms of the invention may be made into cured fiber-reinforced composite materials by a variety of liquid-molding processes. In one, vacuum-assisted resin transfer molding, a matrix material such as a resin is introduced to a mold containing the multiaxial preform under vacuum. As illustrated in FIG. 4, the mold 24 typically defines one or more surfaces corresponding to a desired contour of the finished composite member 22 so that the preform 20 is supported in the desired configuration. The matrix material infuses the preform 20 and saturates the interlayers 6 between the layers 2 of unidirectional fibers. The interlayers 6 are made of a material that is permeable to permit the flow of the matrix material during the liquid-molding operation. Furthermore, the stitches 8 between the layers 2 and interlayers 6 hold the unidirectional fibers in place during the infusion process. The mold 24, which is only partially illustrated in FIG. 4, can be a closed vessel-like device for containing the vacuum. In another method, typically referred to as resin transfer molding, resin is infused under pressure into a closed mold. These and other liquid-molding processes may be used to prepare the cured fiber-reinforced composite material of the invention.

Following infusion of the resin in the mold 24 in a process such as those described above, the mold 24 is heated to cure the resin to produce the finished composite member 22. During heating, the resin or other matrix material reacts with itself to form crosslinks in the matrix of the composite material. After an initial period of heating, the resin gels. At gel, the resin no longer flows, but rather behaves as a solid. In some cases, the resin can be gelled at a temperature that is below the melting point of the thermoplastic fibers of the interlayer 6 in order to prevent their melting and flowing into the reinforcement fiber bundles. After gel, the temperature may be ramped up to a final temperature to complete the cure. The final cure temperature depends on the nature and properties of the thermosetting resin chosen. For the case of aerospace-grade epoxy resins, it is conventional to ramp the temperature after gel up to a temperature range of 325 to 375° F. and hold at this temperature for 1 to 6 hours to complete the cure.

For example, it is known that, in certain instances, thermoplastic dissolved into a matrix resin may increase a resin's Mode I fracture toughness. In a composite subjected to impact, the increase in a resin's Mode I fracture toughness has the effect of reducing the amount of matrix cracking that occurs due to impact. Alternatively, this may be stated that the increase in the resin's Mode I fracture toughness requires more energy to form matrix cracks in the composite due to an impact than an otherwise equivalent composite made with an untoughened version of the same matrix resin. Thus, the increase in the matrix Mode I fracture toughness reduces the amount of damage due to an impact, specifically by reducing the amount of cracking in the matrix.

Undissolved layers, if selected appropriately, may increase the Mode II fracture toughness of the composite. In general, they do little, if anything, to change the fracture toughness of the matrix resin. In a composite subjected to impact, the increased Mode II fracture toughness is manifested by a reduced propensity for delaminations to occur between the plies of the composite material. Alternatively, this may be stated that the increase in the Mode II fracture toughness of the composite requires more energy to delaminate the composite or for damage to grow laterally (perpendicular to the direction of the impact and in the plane of the structural fibers) in the composite than an otherwise equivalent untoughened composite. Thus, the increase in the composite's Mode II fracture toughness reduces the amount of damage due to an impact, specifically by reducing the tendency of the damage to grow laterally away from the point of impact, thereby constraining the volume of material that is damaged due to impact and increasing the composite's residual strength after impact.

Thus, the fracture toughness of the resulting composite members 22 formed according to the present invention can be greater than the fracture toughness of other composite members, such as composite members formed with interlayers 6 between the layers 2 of the reinforcing material. In some cases, the compression-after impact (CAI) strength can be increased by approximately 100% and the impact-damage area can be decreased about 90% for a ½" impact tup at 270 in-lb impact energy.

In some cases, the preforms 20 and composite members 22 can be characterized by an increased impact resistance provided by the interlayers 6 such that the need for stitching is reduced. That is, while some conventional composite members include stitches to increase impact resistance, such increases in impact resistance can instead be provided by the interlayers 6 of the present invention. Thus, according to one embodiment of the present invention, the stitching of the composite material can be provided primarily for securing the layers 2 and interlayers 6 in the desired configuration, and the amount of stitching can be less than that which would be required for increasing impact resistance in the absence of the interlayers 6.

EXAMPLES

The results shown below are for compression-after-impact (CAI) panels made and tested according to BMS 8-276 (a Boeing material specification for a toughened prepreg system used for commercial aircraft) using BSS 7260 Type II, Class 1 impact with an impact energy of 270 in-lb.

Test panels were prepared as follows. The panel lay-up was $(+45/0/-45/90)_{3S}$ using unidirectional fabric from Anchor Reinforcements (Huntington Beach, Calif.) to which spunbonded fabric had been melt-bonded. A control used only a thermoplastic weft fiber to hold the fabric together. The three spunbonded fabrics were supplied by Spunfab (Cuyahoga Falls, Ohio) in areal weights of 0.125, 0.250, and 0.375 oz/yd². The three materials used were PE2900, a polyester; VI6010, a ternary polymer blend; and PA1008, a polyamide.

A dry, uni-directional tape 13-inches in width was prepared by melt-bonding the respective spunbonded fabrics onto a tape containing 190 g/m² of T700 carbon fibers (Toray, Tokyo, Japan). The unidirectional tape was cut in the same manner as prepreg and laid-up according to BMS 8-276 as described above. The laid-up fabric was VARTM processed using an epoxy resin, TV-15, from Applied Poleramic, Inc. (Benicia, Calif.). After infusion and cure, the resulting panels were machined into 4"×6" impact test specimens according to BSS7260. Impact was performed using a 0.3125" spherical steel tup. Four panels for each construction were tested.

After impact, all specimens were ultrasonically C-scanned. Impact damage areas were calculated directly from the center "hole" shown in the amplitude plots using the built-in software tool on the C-scan apparatus. These results are shown in Table 1.

Compression-after-impact strength results are shown in Table 2 and panel thicknesses and per-ply thicknesses are shown in Table 3. Tables 1 and 2 show significant decreases in impact damage area for the PA1008 and VI6010 interlayer materials as well as significant increases in compressionafter-impact strength for these same materials, respectively. Table 3 shows that the interlayer-toughening concept meets the current commercial Boeing specification (BMS 8-276) for per-ply thickness.

TABLE 1

Average Impact Damage Area for Three Panels vs. Control.

| Examples | Spunbonded Fabric | none | Impact Damage Area (in$^2$) Interlayer Areal Weight | | | Percent Change in Impact Area Interlayer Areal Weight | | |
|---|---|---|---|---|---|---|---|---|
| | | | 0.125 oz/yd$^2$ | 0.250 oz/yd$^2$ | 0.375 oz/yd$^2$ | 0.125 oz/yd$^2$ | 0.250 oz/yd$^2$ | 0.375 oz/yd$^2$ |
| Comparative | Control | 7.134 | | | | N/A | N/A | N/A |
| 1 | PE2900 | | 8.258 | 8.632 | 10.037 | 15.8 | 21.0 | 40.7 |
| 2 | V16010 | | 4.529 | 3.936 | 2.093 | −36.5 | −44.8 | −70.7 |
| 3 | PA1008 | | 1.489 | 1.160 | 0.619 | −79.1 | −83.7 | −91.3 |

TABLE 2

Average Compression-After-Impact Strength for Three Panels vs. Control.

| Examples | none | CAI Strength (ksi) Interlayer Areal Weight | | | Percent Change CAI Strength Interlayer Areal Weight | | |
|---|---|---|---|---|---|---|---|
| | | 0.125 oz/yd$^2$ | 0.250 oz/yd$^2$ | 0.375 oz/yd$^2$ | 0.125 oz/yd$^2$ | 0.250 oz/yd$^2$ | 0.375 oz/yd$^2$ |
| Comparative | 19.3 | | | | | | |
| 1 | | 17.2 | 15.6 | 13.8 | −10.9 | −19.2 | −28.6 |
| 2 | | 20.5 | 24.3 | 29.4 | 6.1 | 26.2 | 52.6 |
| 3 | | 30.6 | 27.8 | 39.6 | 58.6 | 44.4 | 105.3 |

TABLE 3

Average Cured-Panel Thicknesses.

| Examples | Average Panel Thickness (in) Interlayer Areal Weight | | | | Average Per-Ply Thickness (mil)* Interlayer Areal Weight | | | |
|---|---|---|---|---|---|---|---|---|
| | none | 0.125 oz/yd$^2$ | 0.250 oz/yd$^2$ | 0.375 oz/yd$^2$ | none | 0.125 oz/yd$^2$ | 0.250 oz/yd$^2$ | 0.375 oz/yd$^2$ |
| Comparative | 0.170 | | | | 7.08 | | | |
| 1 | | 0.175 | 0.185 | 0.186 | | 7.29 | 7.71 | 7.75 |
| 2 | | 0.173 | 0.182 | 0.180 | | 7.21 | 7.58 | 7.50 |
| 3 | | 0.177 | 0.189 | 0.187 | | 7.38 | 7.88 | 7.79 |

*calculated from average thickness/24 plies

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for continuously forming a composite material, the method comprising:
   providing a plurality of reinforcing layers formed of fibers of a reinforcing material;
   providing a plurality of interlayers, each interlayer being formed of a nonwoven fabric of continuous thermoplastic fibers different than the fibers of the reinforcing layers, wherein providing the plurality of interlayers comprises forming the nonwoven fabric by at least one of the group consisting of spunbonding and spunlacing;
   continuously feeding the reinforcing layers and the interlayers in an alternating configuration to a nip; and
   stitching, at a knitting unit downstream of the nip, the continuously fed reinforcing layers and the interlayers with a thread,
   wherein providing the interlayers comprises providing the interlayers of a substantially tackless material such that the reinforcing layers and the interlayers are substantially unbonded prior to said stitching step.

2. A method according to claim 1 wherein said second providing step comprises forming the interlayers of a material comprising at least one of the group consisting of polyamide, polyimide, polyamide-imide, polyester, polybutadiene, polyurethane, polypropylene, polyetherimide, polysulfone, polyethersulfone, polyphenylsulfone, polyphenylene sulfide, polyetherketone, polyethertherketone, polyarylamide, polyketone, polyphthalamide, polyphenylenether, polybutylene terephthalate, polyethylene terephthalate, polyester-polyarylate, polyaramid, polybenzoxazole, viscose, carbon-fiber, and glass-fiber.

3. A method according to claim 1 wherein said stitching step comprises disposing a plurality of stitches, each stitch extending through each of the reinforcing layers and interlayers.

4. A method according to claim 1 wherein said continuously feeding step comprises disposing the reinforcing layers and the interlayers in a configuration having a width of at least about 50 inches.

5. A method according to claim 1 wherein said step of providing the interlayers comprises forming the nonwoven fabric of a mechanical mix of dissimilar fibers.

6. A method according to claim 1 wherein said step of providing the interlayers comprises forming the nonwoven fabric of multi-component fibers.

7. A method according to claim 1 further comprising melt bonding the interlayers to the reinforcing layers.

8. A method according to claim 1 wherein the alternating configuration of the reinforcing layers and interlayers comprises a preform, and wherein the preform is free of a tackifier between adjacent ones of the reinforcing layers and the interlayers.

9. A method according to claim 1 wherein the continuous thermoplastic fibers of the plurality of interlayers have diameters from 10 to 75 microns.

10. A method according to claim 1 wherein the thermoplastic material of the interlayers is selected to have chemical compatibility with the thermosetting matrix material so as to increase the impact resistance of the composite material.

11. A method for continuously forming a composite material, the method comprising:
  providing a plurality of reinforcing layers formed of fibers of a reinforcing material;
  providing a plurality of interlayers, each interlayer being formed of a nonwoven fabric of continuous thermoplastic fibers different than the fibers of the reinforcing layers, wherein providing the plurality of interlayers comprises forming the nonwoven fabric by at least one of the group consisting of spunbonding, spunlacing and fabric meshing, wherein the plurality of interlayers have different respective thicknesses;
  continuously feeding the reinforcing layers and the interlayers in an alternating configuration to a nip; and
  stitching, at a knitting unit downstream of the nip, the continuously fed reinforcing layers and the interlayers with a thread.

12. A method according to claim 11 wherein the respective thicknesses of the interlayers are dependent upon a relative position of the interlayers with respect to the plurality of reinforcing layers.

13. A method according to claim 12 wherein continuously feeding the reinforcing layers and the interlayers in an alternating configuration comprises disposing a first interlayer between a pair of reinforcing layers and disposing a second interlayer proximate an outer face of an outermost reinforcing layer, wherein the second interlayer is thinner than the first interlayer.

14. A method according to claim 13 wherein the thickness of the second interlayer is about half the thickness of the first interlayer.

15. A method of manufacturing a composite part comprising:
  providing a multi-layered uncured composite material having a plurality of reinforcing layers formed of fibers of a reinforcing material in an alternating configuration with a plurality of interlayers, each interlayer being formed of a nonwoven fabric of continuous thermoplastic fibers different than the fibers of the reinforcing layers, wherein providing the multi-layered uncured composite material comprises forming the nonwoven fabric by at least one of the group consisting of spunbonding and spunlacing, and wherein providing the multi-layered uncured composite material comprises providing the interlayers of a substantially tackless material such that the reinforcing layers and the interlayers are substantially unbonded;
  configuring the alternating reinforcing layers and the interlayers in a contoured configuration corresponding to a desired contour of the composite material; and
  infusing the reinforcing layers with a thermosetting matrix material such that the thermosetting matrix material flows through the interlayers.

16. A method according to claim 15, further comprising curing the matrix material, wherein said infusing and curing steps comprise delivering the matrix material through the interlayers and curing the matrix material such that a nonwoven fabric morphology of the interlayers remains intact.

17. A method according to claim 15 wherein the continuous thermoplastic fibers of the plurality of interlayers have diameters from 10 to 75 microns.

18. A method of manufacturing a composite part comprising:
  providing a multi-layered uncured composite material having a plurality of reinforcing layers formed of fibers of a reinforcing material in an alternating configuration with a plurality of interlayers, each interlayer being formed of a nonwoven fabric of continuous thermoplastic fibers different than the fibers of the reinforcing layers, wherein providing the multi-layered uncured composite material comprises forming the nonwoven fabric by at least one of the group consisting of spunbonding, spunlacing and fabric meshing, wherein the plurality of interlayers have different respective thicknesses;
  configuring the alternating reinforcing layers and the interlayers in a contoured configuration corresponding to a desired contour of the composite material; and
  infusing the reinforcing layers with a thermosetting matrix material such that the thermosetting matrix material flows through the interlayers.

19. A method according to claim 18 wherein the respective thicknesses of the interlayers are dependent upon a relative position of the interlayers with respect to the plurality of reinforcing layers.

20. A method according to claim 19 wherein a first interlayer is positioned between a pair of reinforcing layers and a second interlayer is positioned proximate an outer face of an outermost reinforcing layer, wherein the second interlayer is thinner than the first interlayer.

21. A method according to claim 20 wherein the thickness of the second interlayer is about half the thickness of the first interlayer.

* * * * *